Nov. 2, 1937.  W. R. SCHARSCH  2,097,471
MACHINE AND METHOD FOR COOKING A COMPLETE MEAL
Filed May 22, 1935  4 Sheets-Sheet 1

Inventor
Valter R. Scharsch
By Charles L. Reynolds
Attorney

Nov. 2, 1937.   W. R. SCHARSCH   2,097,471
MACHINE AND METHOD FOR COOKING A COMPLETE MEAL
Filed May 22, 1935   4 Sheets-Sheet 2

Inventor
Walter R. Scharsch
By Charles L. Reynolds
Attorney

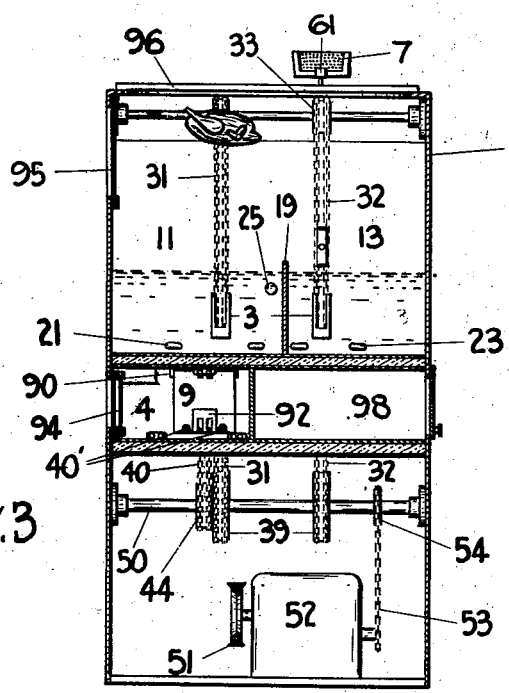
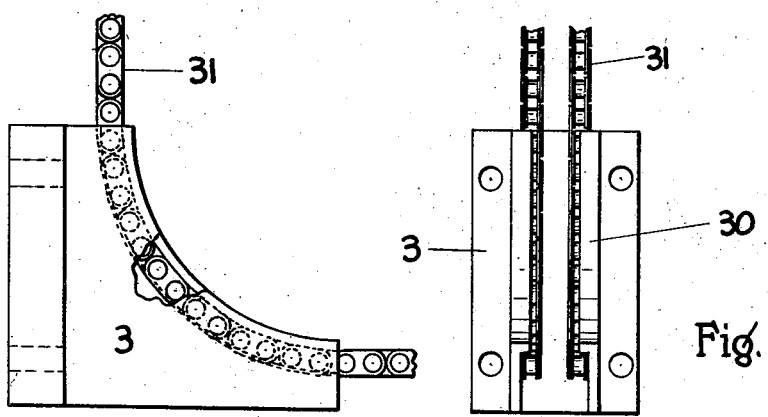
Fig. 3
Fig. 4
Fig. 5
Inventor
Walter R. Scharsch
By Charles L. Reynolds
Attorney

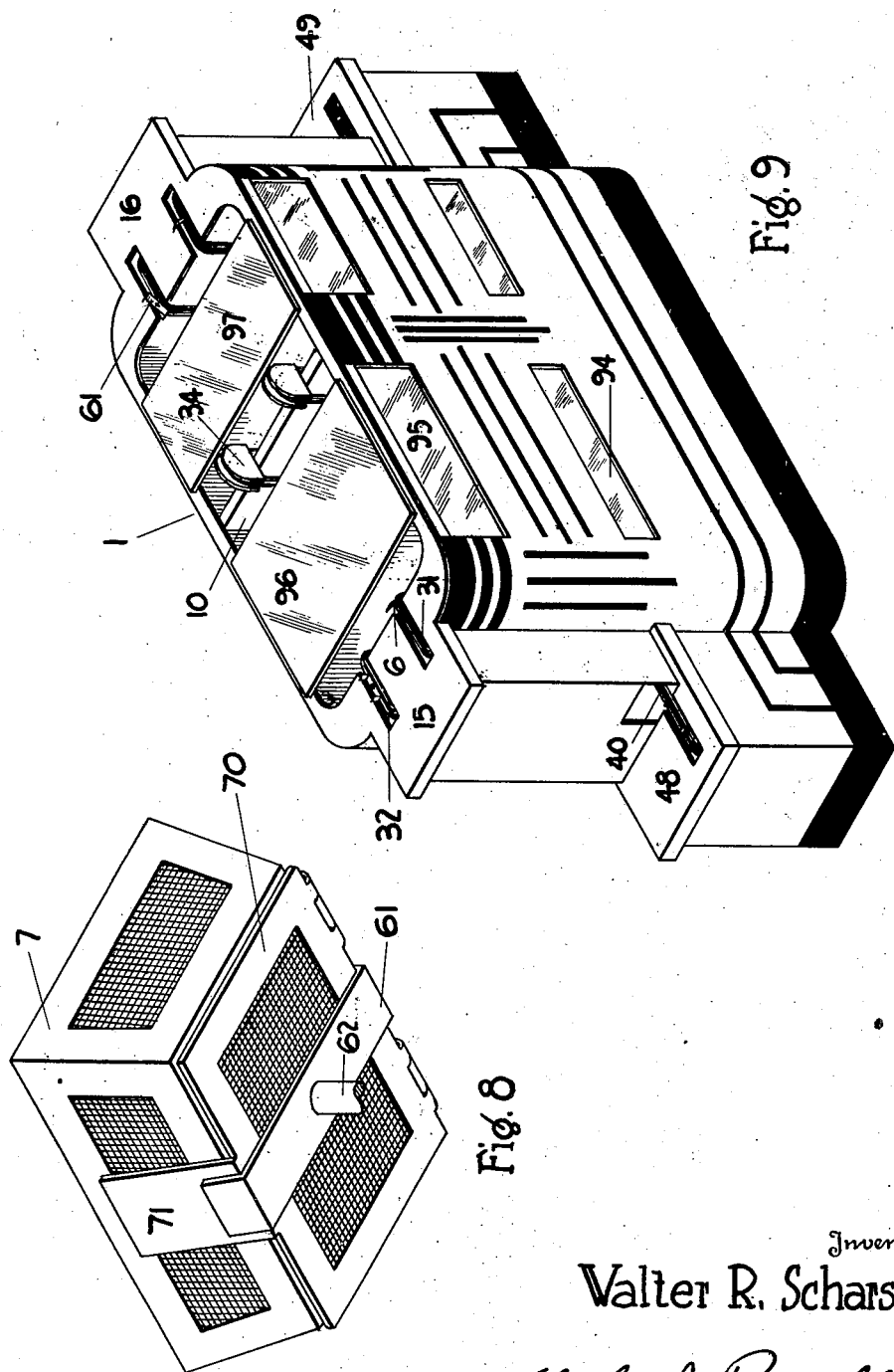

Patented Nov. 2, 1937

2,097,471

UNITED STATES PATENT OFFICE 2,097,471

MACHINE AND METHOD FOR COOKING A COMPLETE MEAL

Walter R. Scharsch, Portland, Oreg.

Application May 22, 1935, Serial No. 22,766

19 Claims. (Cl. 53—15)

My invention relates to the culinary art, the ultimate aim of which is to produce delicious food perfectly cooked and tastefully served; hence, generally speaking, the object of my invention is to approach this ideal as closely as possible, yet by a machine and method adapted to rapid quantity production of meals, as in a restaurant, and adapted to variation in or choice among the several components of a meal, as individual tastes vary, but without confusion, likelihood of mistake in serving, or interruption of the routine of cooking and serving.

It is, too, a further aim to lessen the overhead of a restaurant, in part by eliminating the necessity for employing skilled cooks (fry cooks, bakers, etc.), through cooking of each component under the conditions of time, temperature, and amount of heat best suited for such component, such factors being automatically controlled and maintained, and therefore eliminating the factor of human skill and attention. By eliminating the necessity for high-priced help, the saving may be put into the quality or quantity of the food, or passed on to the patron, thereby inuring to his advantage.

More specifically, it is an object to provide a machine and a method whereby each of several components of a meal, one or more of which may differ from others in the time, temperature, or total amount and manner of application of heat required to cook it, may all be started cooking simultaneously, as an order is received, and each will progress to a delivery point, being subjected during its travel to the conditions best suited for cooking this particular component (though such conditions may be unsuitable for cooking another component, the latter being subjected to conditions best suited to its cooking), and all arrive substantially simultaneously at a delivery point or points, whereby the several components delivered at one time are known to be part of one order, all properly cooked, hot, and ready to serve.

The present application is a continuation in part of my application Serial No. 738,593, filed August 6, 1934.

The aim stated immediately above is the particular object of my invention, but more generally it is an object to provide a machine and a method whereby any one or the several various components of a meal may be cooked automatically, with conditions so maintained that the cooking will be properly done, and the food will be delivered just properly cooked and ready to eat. For example, chops may be cooked in such a machine, and will be delivered thoroughly cooked, yet tender and full of the natural juices, which are not permitted to escape. Oysters, fish, foods dipped in batter, or steaks may similarly be cooked. The machine is so formed and arranged, in furtherance of one of the objects of my invention, that a patron desiring a steak well done may have it, or, if he wishes it medium well done, or even rare, he may be accommodated without confusion, yet in any event the steak will be thoroughly and properly cooked, and will not have lost its essential juices.

Furthermore, by this method of cooking it is made possible by thoroughly scientific and automatic cooking of meats in particular to quickly yet thoroughly cook a piece of meat and to deliver it tender, even though it may be of poor or indifferent grade to start with.

Again, cooking in deep fat does not, of itself, insure proper cooking of the food, and it is a further object to provide a machine and method whereby foods of many kinds can be properly cooked in deep fat, and in such a way that when completed it is sufficiently moist, tender, and cooked through and through.

As I have intimated above, it is a further object to provide a machine and a method which are flexible and adaptable to the cooking of widely different food items, such as steaks, chops, frankfurters, frankfurters wrapped in dough, fowl, oysters, fish, potatoes, and biscuits. Especially is the machine and process adapted to the cooking of any food which can be immersed in deep fat, and indeed I have discovered that many foods not considered susceptible of cooking in this way can be better cooked in this way.

It is a further object to provide a machine of the general character indicated, which shall be simple, compact, and comparatively inexpensive, which conserves heat to the greatest degree practicable, and in which heat is mutually transferred from one unit to another, to some extent, but which is capable of independent regulation of the heat of different units.

It is a further object to arrange such a machine in a manner which will deliver the food hot shortly after its cooking has been completed, but which will permit the fat to drain from the food, preferably back into the tank from which the food has emerged, in the interval between the completion of cooking and the delivery of the food, so that when delivered it will not be in the least greasy.

Other objects, more especially those which relate to the mechanical details of the machine, will be understood as this specification progresses.

My invention comprises the novel machine, and the novel method of cooking, as illustrated in the accompanying drawings, described in this specification, and more particularly pointed out by the claims which terminate the same, it being understood that various changes may be made in the form, arrangement, and the mechanical details of the machine, and in the steps of the method, without departing from my invention as claimed.

In the accompanying drawings I have shown my invention embodied in a machine of the type now preferred by me.

Figure 3 is a transverse vertical section substantially on the line 3—3 of Figure 1.

Figure 4 is a side elevation, with parts broken away, and Figure 5 is an elevation taken at right angles to Figure 4, illustrating the angled guide for the conveyor chains, which is within the tank.

Figure 8 is a bottom perspective view of a basket for containing such foods as potatoes, fish, oysters and the like.

Figure 9 is a perspective view of the complete machine.

Figure 1:
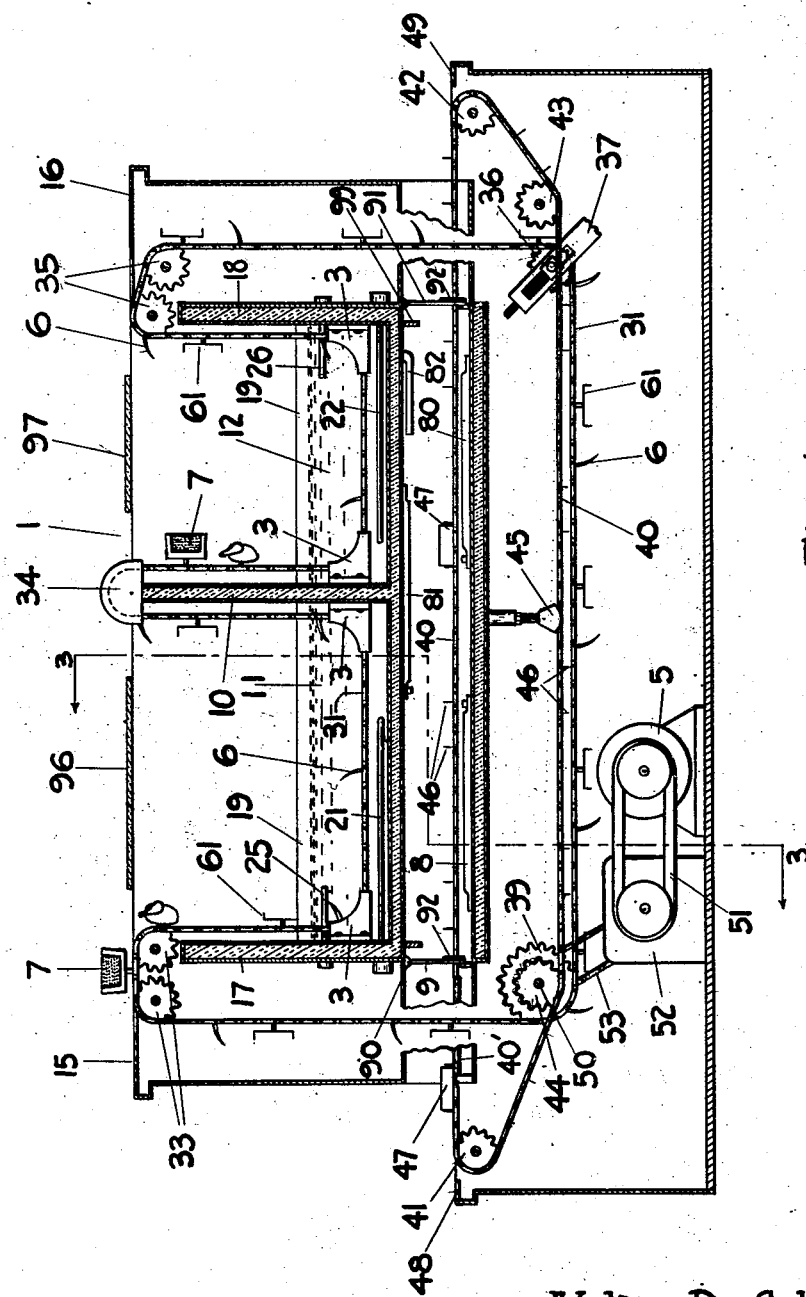
Figure 1 is a longitudinal vertical section through a complete machine, electrical connections, however, being omitted.
Figure 2:
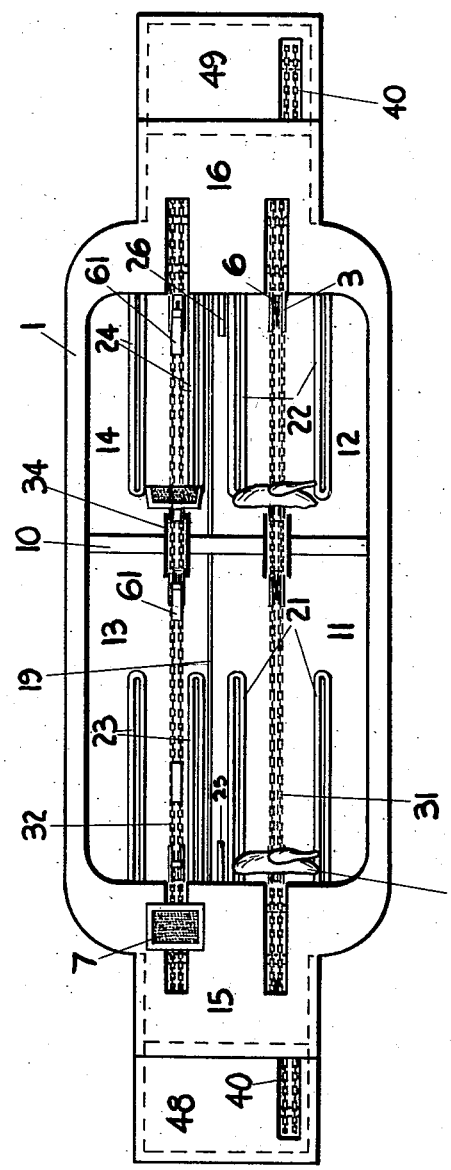
Figure 2 is a top plan view of the machine.
Figure 6:
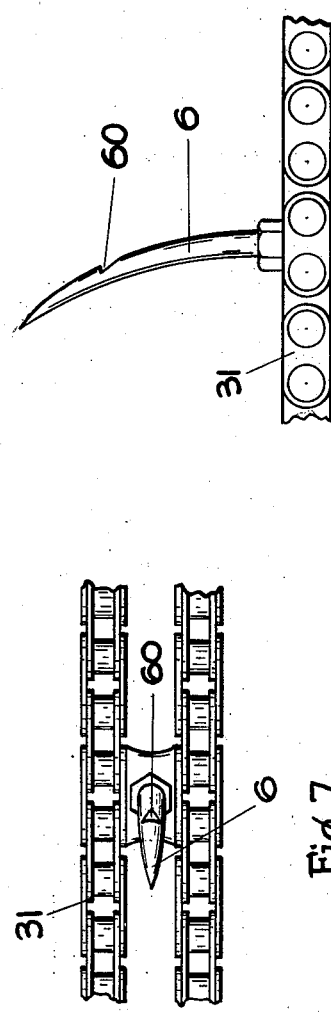
Figure 6 is a side elevation, and Figure 7 a plan view, of such a conveyor chain and the element carried thereby for securing such foods as meat.
Figure 7:
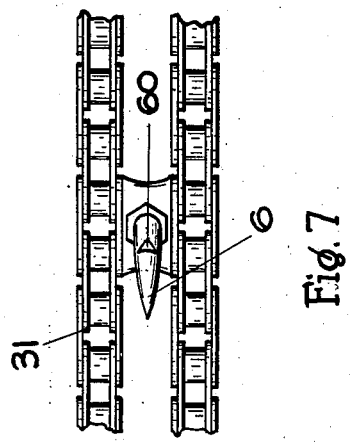

It is recognized that some foods can be cooked by submerging them in deep fat. I have discovered that, by proper handling, a great many foods may be so cooked. Some foods will require a temperature higher than other foods or subjection to the temperature of the fat for a longer time, or it may be desirable, in order to cook foods to different degrees, for example cooking steaks rare, medium or well done, to subject them for different periods of time to submergence in the fat, or to different temperatures. This requires flexibility of control. Accordingly my machine comprises a tank, generally designated by the numeral 1, preferably having insulated walls and having, if desired, an insulated bottom, which is partitioned to define several individual compartments. The tank is conveniently divided by a transverse partition 10, which should be insulated, and which is shown as placed nearer one end of the tank than the other. It may be subdivided by one or more longitudinal partitions 19, preferably extending from end to end of the tank, to define, in the embodiment shown, the several cooking compartments 11, 12, 13, and 14. Thus the compartments 11 and 12 are aligned, but separated from each other by the transverse partition 10, and the compartments 13 and 14 are aligned, similarly separated from each other, and separated from the compartments 11 and 12, respectively, by the partition 19, which ordinarily need not be insulated.

Each of these compartments is intended to receive a grease suitable for cooking, of which there are a number available on the market. To heat the grease suitable means are provided, and preferably these consist of the electric heating elements of a type adapted to be submerged and indicated at 21, 22, 23, and 24. These heating elements may be substantially identical, although as will appear later, the heating capacity of certain of them may be different from that of others. These elements are preferably located near the bottom of each compartment, extending through the end walls 17 and 18 of the tank, whereby they may be readily removed when necessary.

To control the temperature in the several compartments suitable means are provided, such as the thermostats 25 and 26. These may be similarly supported in the respective end walls of the tank, and since the partition 19 is not, in the embodiment shown, of insulating character, the thermostat 25 may control the temperature in the compartments 11 and 13, and the thermostat 26 may control the temperature in the compartments 12 and 14.

The electrical connections to the heating elements and to the thermostats, and all electrical control means, have been omitted from the drawings to avoid confusion, and because they are common in the electrical art, and of themselves form no part of the present invention. As will be obvious, the thermostat 25 will be so connected in the electrical system as to control the supply of current to the heating elements 21 and 23, and the thermostat 26 similarly controls the supply of current to the heating elements 22 and 24.

But mere submergence in deep fat will often produce improperly cooked food, and this cannot be materially improved by altering the temperature or time of submergence. If it is found that the food is not cooked through, an increased temperature or longer submergence may result only in overcooking or burning the outside of the food, without compensating results in the center. If the temperature is reduced there is danger of the grease impregnating the food, and of failing to cook even the outside properly. I have discovered that perfect results can be obtained by a continuous relative movement between the food and the grease, the temperature and time of submergence being regulated so that the food will not burn, but will cook through, during the period of submergence permitted.

The rate of movement need not be rapid, and in the machine illustrated, which has been in use, the food travels through the grease at a rate of about one foot each minute. It appears that the submergence of the food locally chills the grease immediately surrounding it, and steam emitted from the surface of the food forms, in effect, an insulating envelope. Movement of the food through the grease breaks up and dispels this envelope, brings the food continually into contact with new, hot grease, and brings the grease into more intimate association with the food. While this may not be the correct explanation, results have shown that relative movement of the food and grease is of great importance, hence means are provided for accomplishing this.

At one end of the tank there is provided a feed table 15, and at its opposite end is a delivery table 16. Between these two tables extend conveyor means, such as the chains 31 and 32, on which are adapted to be secured the different components which are to be passed through the hot grease. Preferably these chains extend over suitable guide means, such as the loose sprocket wheels 33 just beneath the surface of the feed table 15, thence down the end wall 17 of the tank to a point below the surface of the grease, thence through curved guides 3 (see Figures 4 and 5) having inturned flanges 30 to embrace and restrain the chains, across the bottom of the tank, preferably spaced somewhat above the tank bottom and above the heating element which is adjacent the bottom, to similar curved guides at the opposite end of the first compartment, thence up the wall of the partition 10, over curved guides 34 at the top of this partition, and down the opposite wall of the partition into the aligned compartment, thence through additional curved guides 3, across the bottom of this second compartment, through other curved guides 3 and up the end wall 18 of the tank, passing over guide sprockets or the like, indicated at 35, just beneath the surface of the delivery table 16. The chains pass thence downwardly to idler sprockets 36 supported in a suitable chain-tightening device 37, across beneath the tank, and about a drive sprocket 39 on the drive shaft 50. In operation, therefore, the machine affords two series of hot grease compartments through which the components of a meal may travel concurrently: one comprising the earlier compartment 11 and the later compartment 12, and the other the earlier compartment 13 and the later compartment 14.

Power may be supplied from a motor 5, driving the shaft 50 through a belt 51, a reduction gear 52, and a chain 53 to a sprocket wheel 54 on the shaft 50 (see Figures 1 and 3). Since the distance to be traveled by each of the chains 31 and 32 is the same, (although they may be arranged to travel different distances, if desired or found necessary) the speed of travel of each of these two chains should be identical, and may be so calculated that a piece of food placed on either one of the chains at the feed table 15 will require say from nine to ten minutes to pass through the two compartments and arrive at the feed table 16, and this fixes the time for cooking the meal. If it should be desired to make one of these chains 31 or 32 travel a shorter distance, this might be accomplished, for example, by lessening the height over the partition 10 over which it must travel, but if the two are to start and finish simultaneously, as is desirable, the speed of the two chains must then be made different to compensate for the difference in the length of the respective paths through which they must travel.

The chain 31 may be in most respects similar to the chain 32, except preferably the chain 31 is provided with means for impaling a piece of meat, and the chain 32 with means to support a basket. Thus there are provided at intervals along the chain 31 skewers in the form of curved spikes or prongs 6, and these are provided preferably with a barb 60 so that meat impaled thereon will be prevented from falling off while the chain is traveling through the cooking compartment, but the curvature of the spike is such, and is so placed with relation to ways formed by the surface of the delivery table 16 and the curvature of the sprocket wheels 35, that if the meat is not manually removed from the spike, the spike will be automatically withdrawn from the meat, which comes to rest on the delivery table, without damage to the meat, the curvature of the spike being approximately the curvature about which the chain passes in dropping below the surface of the delivery table.

On the chain 32, on the other hand, I provide means for supporting a basket 7 (see Figure 8) which may contain potatoes, fish, oysters, food dipped in batter, biscuits, or any type of food, in fact, but which is especially intended to contain food which may crumble or flake, or which consists of a number of loose pieces, for instance shoe string or French fry potatoes. The basket is held in a clip 61 supported by a stud 62, which is mounted in the chain 32, the ends of the clip 61 being upturned and frictionally engaging the sides of the basket 7. The basket will be disengaged from the clip automatically when the basket comes to rest upon the surface of the delivery table 16 and the clip is drawn down beneath the surface of this table as the chain progresses. The basket may be provided with a hinged cover 70 having a tongue 71 adapted to lie alongside the side of the basket which is opposite the hinge, whereby it may be grasped by the fingers to hold the basket inverted, and to hold the cover closed while the basket is being engaged with a clip 61.

While biscuits may be baked by immersing them, enclosed within a basket 7, in the deep fat, the patron will usually prefer (because of the persistence of this custom) that they be baked in an oven, or it may be desired to bake individual pies, custards, puddings, or the like, which can not be immersed in deep fat. To such end I provide a tunnel oven 4, which I prefer to locate immediately beneath the tank 1, so that heat from the oven will tend to maintain the temperatures in the fat compartments, or vice versa, thus to conserve the heat. Through this oven passes another conveyor element, such as the chain 40. The chain 40 may be supported on rollers or sprockets 41, 42, and 43, which guide it through the oven and thence below the oven, and it may be driven by a sprocket wheel 44 mounted upon the shaft 50. A suitable tightener 45 may be provided.

In the embodiment shown the distance through which the chain 40 must travel is less than the distance through which either of the chains 31 and 32 must travel; therefore in order that a pan of biscuits, which is started into the oven at the same time that a basket of potatoes and a half chicken is started on the chains 32 and 31, respectively, may finish and be delivered substantially simultaneously, the speed of travel of the chain 40 should be less than the speed of travel of the chains 31 and 32; therefore the drive sprocket 44 for the chain 40 is made smaller than the drive sprockets 39 for the other two chains. These factors can obviously be so designed as to be correlated with each other, that is, the factors of distance traveled and speed of travel, and with both of them may be correlated the factor of heat supplied, in degree and amount.

The chain 40 is provided at intervals with upstanding clips or dogs 46, which engage a pan 47 in which biscuits may be placed, sliding along rods 40', placed parallel to the chain 40, and the biscuits thus travel from a feed table 48, which is preferably located adjacent the feed table 15, to a delivery table 49 which is preferably located adjacent the delivery table 16.

Various heating elements as required for such an oven are placed therein. The element 8, placed near the entrance to the oven, effects the raising of the biscuits, and their further cooking is accomplished by an element 80, both of these lying beneath the chain 4, while the browning is accomplished by an element 81 placed on or near the ceiling of the oven. A thermostat 82 may be provided to control the several heating elements, and thereby the temperature of the oven.

To conserve heat in the oven I provide breaker strips 99, and doors 9 hinged at 90 adjacent the ceiling of the oven, which will swing in the direction of travel of the chain 40 to permit a pan of biscuits to pass, and a similar door 91 may be provided at the exit end of the oven. Preferably additional small doors 92 are provided on each of the main doors 9 and 91, these riding only on the chain in the intervals between the clips 46 and any pans 47 carried thereby.

The oven 4 may conveniently be provided with windows, preferably of double glass for insulation, as indicated at 94, so that the progress of the biscuits may be observed as the cooking progresses. Indeed, windows 95 may be provided looking into the main tank, so that the progress of the food being cooked may be watched. All down runs and return runs of the chains, as well as the drive arrangements, are suitably enclosed, and the machine may be placed in a conspicuous spot in the restaurant where it will be an attraction of itself. To lessen the loss of heat and to hold down the emission of vapors and odors, I may employ glass covers over the compartments of the tank, these covers being indicated at 96 and 97. The ends of these covers are spaced sufficiently from the end walls 17 and 18 and from the partition wall 10 to permit passage of the food or the basket 7.

It is believed that the manner of using the machine and the general method of cooking will be apparent. Food, such as a half chicken C, is placed upon a spike 6 at the feed table 15, and at about the same time a basket 7 previously filled with potatoes ready for French frying is placed upon a clip 61. A previously prepared pan of biscuits is placed between clips 46 of the chain 40, all these different components starting substantially simultaneously. The pan of biscuits travels slowly through the tunnel oven 4, and the chicken and basket of potatoes travels at a more rapid rate (about one foot a minute) but by a more circuitous and longer path, first down the end wall 17, beneath the surface of the grease in the first compartment 11 or 13, then along the bottom of this compartment, submerged beneath the surface of the grease, up the wall of the partition 10 and over the top of this partition, then down on the opposite side of the partition, and again beneath the grease in the compartment 12 or 14, passing across the bottom submerged, and finally up the end wall 18 to the delivery table 16. Since the chains 31 and 32 travel at the same rate, it is obvious that the chicken and the potatoes will arrive substantially simultaneously, and with the speed of travel of the chain 40 properly correlated with the speed and distance of the travel of the chains 31 and 32, the pan of biscuits will arrive at the delivery table 49 at substantially the same time, and thus all elements of the meal which started simultaneously are completely cooked and delivered simultaneously.

I prefer that the grease in the compartments 11 and 13 be kept at a temperature of about 350° Fahrenheit, which is sufficient to sear the meat and seal in the juices, in meat, fowl, potatoes, and in other foods, and the foods are given the primary cooking in the compartment 11 or 13, which is longer than the aligned compartment 12 or 14, respectively. In other words, many or most foods will be substantially or even edibly cooked in the period of their submerged travel through the lower temperature grease in the compartment 11 or 13, according to some tastes,—though not finished or browned according to the taste of those who like them very thoroughly or abundantly cooked. As the food passes up the wall of the partition 10, the grease is permitted to drain off, and the food is again plunged beneath the grease in the compartment 12 or 14. This grease is preferably maintained at a higher temperature, in the vicinity of 375° F., which is sufficient to complete the cooking in a comparatively shorter time and to brown the foods. In other words, the food moves, during different portions of its total period of submergence, through bodies of grease heated to different temperatures, and is differently affected thereby. Again as the food travels up the end wall 18, the grease drains off it, and drops back into the tank. When the food arrives at the delivery table, some nine or ten minutes after being placed on the conveyor at the feed table 15, the food is hot, freshly and abundantly cooked, free of grease, generally moist, and the cooking has been completed automatically without attention on the part of any attendant, in just the right way and to the right degree, and experience has shown that it is extremely tender and palatable.

A well done steak will pass through both compartments 11 and 12. If a patron desires a steak cooked medium well done, the steak may be fed into the machine in the manner described, but it comes into view again as it passes over the top of the partition 10, and it may be removed from the conveyer at this point, and kept hot in a warming closet 98 located alongside the oven 4, until the remainder of the meal is cooked, or it may be started at about the time the potatoes emerge from the grease in the compartment 13, and taken off as the steak arrives at the top of the partition 10, at which time the potatoes will have arrived at the delivery table 16. If the patron desires a rare steak, the steak may be placed on the conveyer chain 31, at the partition 10, at about the time the potatoes appear at the top of the partition 10, and the steak then passes only through the grease in the compartment 12. Thus while the time of cooking of the steak is less, the temperature is higher and the steak is cooked rare, with the juices well sealed into it, yet even low grade meat may be made extremely tender and palatable when cooked rare in this manner.

I have found that biscuits may be cooked by submerging them and advancing them through the deep fat, for this purpose being contained in baskets 7. Similarly oysters may be cooked in these baskets, or articles which have been dipped in batter, or fish which may flake off may be so cooked. The machine is flexible and adaptable to the cooking of a wide variety of foods, and foods which require different time or temperature conditions, yet little skill or experience is required to accomplish the cooking, and to accomplish it in a manner which is better than it can be done by skilled cooks, especially if the latter are engaged in handling a rush of business.

It is ordinarily considered undesirable to use over again, or at least for any lengthy period, grease which has previously been used for cooking. Perhaps one of the reasons for this objection to the use of old grease is the number of particles of food which fall off into the grease, due to the necessity of handling the food, but this, of course, is almost completely eliminated in my machine, since the food need not be handled from the feed point to the delivery point. However, I have discovered that the same grease may be used over and over for long periods without deterioration, apparently due to the fact that the total quantity of grease is so great, as compared with the mass of food which enters it, that the temperature of the grease varies but little or not at all. The movement of the food through the grease dissipates any locally chilled grease and quickly brings the food up to the temperature of the grease. Chilling and heating of the grease appears to cause its deterioration more rapidly than any other factor, and by eliminating this to the greatest degree possible, by reason of the quantity used and the relative movement, deterioration is avoided. Furthermore, in normal restaurant operation, the grease will cool but slowly overnight, and will not usually congeal between closing time at night and opening time next morning. The ability to use the same grease for considerable periods of time in itself constitutes a source of considerable saving to the restaurant operator.

What I claim as my invention is:

1. A machine for cooking a plurality of components of a meal, requiring heat treatment for different lengths of time, comprising a plurality of conveyors, one for each such component, means to guide and advance the several conveyors through fixed paths of different lengths, each from a given feed point to a given delivery point, the length of each path being so correlated with the speed of each conveyor that different components started substantially simultaneously each from its feed point will arrive substantially simultaneously each at its delivery point, and means disposed along each path, and regulated in accordance with time and distance of exposure of the component traveling along such path, to supply sufficient heat at the temperature and for the time required for each particular component, to complete its cooking and to prepare it for serving by the time it is discharged at its delivery point.

2. A machine for cooking a plurality of components of a meal, at least one of which requires heat treatment for a length of time different from the others, comprising a conveying means for such different component and other conveying means for other components, means to advance all said conveying means and to guide each for movement from its feed point to its delivery point through its individual fixed path, the length of the path of the first-mentioned conveying means being different from the length of the path of others, but its rate of advance being correspondingly different, whereby different components started substantially simultaneously, each from its feed point, will arrive substantially simultaneously, each at its delivery point, and means disposed along each path, and regulated in accordance with time and distance of exposure of the component traveling along such path, to supply sufficient heat at the temperature and for the time required for each particular component, to complete its cooking by the time it reaches its delivery point.

3. A machine for cooking food comprising a plurality of grease-filled compartments arranged in series, each separated by a wall from an adjoining compartment, means to maintain the grease in each compartment at a temperature appropriate for the cooking step to be performed in such compartment, a conveyor whereon the food may be secured, guide means leading the conveyor from a feed point down one wall of one compartment, below the surface of the grease and across this compartment, thence out of the grease and up the separating wall interposed between this and the adjoining compartment, thence over the wall and down into such adjoining compartment, and below the surface of the grease therein, and then up to a delivery point elevated above the surface of the grease in the second compartment, whereby grease will drain back from the food before delivery, and means to advance the conveyor at a rate such that, in relation to the temperature of the grease in each successive compartment and the time of exposure thereto, the food is delivered cooked and drained of grease.

4. A machine for cooking food comprising a compartment adapted to receive grease, means in such compartment to heat the grease therein to cooking temperatures, a cover over said compartment, a conveyor chain, means thereon to support food to be cooked, and means to guide and advance said chain downward through an opening between one end of the cover and an end wall of the compartment, thence along the bottom of the compartment to its opposite end wall, and thence upward and out through an opening between the other end of the cover and the latter end wall.

5. A machine for cooking a plurality of different components of a meal, which require for their cooking particular temperature factors and different time factors, which comprises a plurality of means, one for each component, and each operable to receive and advance its component through a fixed path of a length different from the others, said plurality of means having their speeds of travel coordinated with respect to the lengths of the paths traversed to complete movement of the various components through their respective paths in substantially equal lengths of time, and means disposed along each path to supply the heat required by and at a temperature appropriate for the particular component moving along each such path.

6. A machine for cooking a plurality of different components of a meal, requiring heat treatment for different lengths of time, comprising individual means to advance each of the several components from a feed station through a fixed path to a delivery station, said means being timed to discharge the components substantially simultaneously when started substantially simultaneously, and means disposed along such paths to supply heat for different lengths of time to the components moving therealong, each of said last-mentioned means supplying heat to its particular component for the length of time required to cook it properly, and at a temperature appropriate for such component.

7. A machine for cooking a plurality of components of a meal, requiring cooking for different lengths of time, comprising a plurality of individual means, one for each component, to move such components through paths of different lengths, but said paths all being of substantially the same overall length between a common feed station and a common delivery station, means to drive the individual first means at such relative speeds as to travel from the feed station to the delivery station in substantially equal lengths of time, and means disposed along each path to subject the respective components to heat at the temperature and for the length of time appropriate for such components, to complete the cooking for discharge at the delivery station substantially simultaneously of all components started substantially simultaneously from the feed station.

8. A machine for cooking simultaneously two components of a meal which require heat treatment for different lengths of time, comprising two conveying means, the first to convey the component requiring the shorter heat treatment through a circuitous path from a common feed station to a common delivery station, and the second to convey the component requiring the longer heat treatment through a more direct path from the feed station to the delivery station, means to advance the first conveying means at a given rate, means to advance said second conveying means at a slower rate than said first conveying means, whereby the two components, started substantially simultaneously from the feed station, will be discharged substantially simultaneously at the delivery station, and means disposed along each path, and regulated in accordance with time and distance of exposure of the component traveling along such path, to supply heat at the temperature and for the time required for each particular component, to complete its cooking by the time it reaches the delivery station.

9. A machine for cooking simultaneously two components of a meal which require heat treatment for different lengths of time, comprising two conveying means, the first to convey the component requiring the shorter heat treatment from a feed point to a delivery point, the second to convey the component requiring the longer heat treatment from a feed point to a delivery point, heating means for said second conveying means to supply heat in regulated quantities and at controlled temperatures to the component carried by such conveying means throughout substantially its entire travel, a plurality of heating means for said first conveying means, arranged in series to expose the component carried by such means in turn to said plurality of heating means and during a part only of its travel, and means guiding said first conveying means to hold the component carried thereby out of the influence of its heat supplying means for the remainder of its travel, whereby the two components started substantially simultaneously will be cooked each for its proper length of time and yet will be finished substantially simultaneously.

10. The method of cooking two components of a meal simultaneously, which require heat treatment for different lengths of time, which comprises the steps of simultaneously initiating, and continuing at a uniform rate of speed, the advance of both components, each through a path including a heated zone, to be delivered substantially simultaneously when started substantially simultaneously, supplying heat in each such zone to the particular component passing therethrough, and regulating the temperature of heat supplied in each zone, and the time of exposure of each component to such heat at such temperature, appropriately to the requirements of the particular component affected, that each component will be properly cooked when delivered.

11. A machine for cooking food, comprising a cabinet defining a tank having insulated walls, for receiving melted grease, an insulated oven adjoining said tank and disposed therebelow, and a compartment below said oven and at the ends of said tank, means to maintain the grease in said tank at cooking temperature, means to maintain the oven at baking temperature, a conveyor chain traveling through said tank, another conveyor chain traveling through said oven, the return runs of both said chains passing through and being enclosed within said compartment to conserve the heat in said tank and said oven, and means in said compartment to drive said chains.

12. A machine for cooking food, comprising a tank partitioned by a wall to define two aligned compartments, each adapted to receive melted grease, means in each compartment to maintain the grease therein at cooking temperature, an oven disposed beneath said tank, means to maintain the oven at baking temperature, a conveyor chain traveling from a feed station through said oven to a delivery station, another conveyor chain traveling from said feed station, in succession, through one of said aligned grease compartments, over the dividing wall, and through the other grease compartment to said delivery station, and means to drive said two chains at such relative speeds as to move portions of each reaching said feed station simultaneously, through their respective paths to reach said delivery station substantially simultaneously.

13. Mechanism for conveying meat to be cooked through a cooking tank of heated grease, comprising a chain movable through said tank, a link engaged in said chain, a meat-piercing prong projecting outward from said link, tapering substantially to a point, and having its tip inclined backward with respect to the advance of the chain, two horizontal ways at the discharge side of said tank, extending lengthwise of said chain, and means guiding said chain for movement close beneath one end of said ways, and progressively thereafter downward away from said ways, to carry said prong between and thereafter to withdraw it substantially lengthwise from between said ways, whereby meat impaled upon said prong will ride up on said ways to be held thereby as the prong is withdrawn, by continued movement with the chain, downward away from the ways and out of the meat engaged thereby.

14. A machine for cooking food comprising two grease-filled compartments arranged in series and separated by a wall, one compartment being of greater length than the other, and preceding such other compartment, means to maintain the temperature of the grease in the longer compartment at a value appropriate to accomplish primary cooking of the food, means to maintain the temperature of the grease in the shorter compartment at a higher value to complete the cooking, a conveyor whereon the food may be secured, guide means to lead the conveyor from a feed point down one wall of the longer compartment, below the surface of the grease therein, across this compartment to the separating wall, over the wall and down below the surface of the grease in the shorter compartment, across this compartment, and finally up the opposite wall thereof to a delivery point, and means to advance the conveyor slowly through such path.

15. A method of cooking two different components of a meal, one of which requires heat treatment for a length of time different from the other, which method consists of starting both such components substantially simultaneously, and advancing them simultaneously, at a controlled rate of speed, each through a different heated zone, the temperature of which is governed in accordance with the particular component passing therethrough, exposing such components to the heat of their respective heated zones, each for a length of time different from the other and appropriate to accomplish its own cooking, to complete the cooking operations of both components substantially simultaneously.

16. An improved method of cooking, by submergence beneath the surface of hot cooking grease, foods such as fowl, steak, fish, and potatoes, which when thus cooked emit an envelope of steam; which method comprises moving the food, during different portions of the period of submerged cooking, through bodies of cooking grease heated to different temperatures, so as to affect the food differently, while by the relative movement of food and grease as aforesaid continually bringing the food into more intimate relation with new hot grease.

17. An improved method of cooking, by submergence beneath the surface of hot cooking grease, foods such as fowl, steak, fish, and potatoes, which when thus cooked emit an envelope of steam; which method comprises first submerging the food in, and moving it thus submerged through, grease heated to a temperature adapted to effect primary cooking, during the period of time required for such primary cooking, and lifting it out of the grease at the end of this period; and then submerging it in, and moving it thus submerged through, grease heated to a different temperature, adapted for finishing the cooking, during the period of time required for thus completing the cooking, and then again lifting it out of the grease.

18. An improved method of cooking, by submergence beneath the surface of hot cooking grease, foods such as fowl, steak, fish, and potatoes, which when thus cooked emit an envelope of steam; which method comprises moving the food, during different portions of the period of submerged cooking, through bodies of cooking grease heated to different temperatures, first for a longer time through heated grease of lower temperature, whereby the food is substantially or edibly cooked, and then for a shorter time through heated grease of higher temperature, whereby the food is finished or browned.

19. A machine for cooking, by submergence beneath the surface of hot cooking grease, foods such as fowl, steak, fish, and potatoes, which when thus cooked emit an envelope of steam; said machine comprising a series of receptacles or compartments adapted for holding grease at different temperatures; means for heating the grease in the compartments and maintaining it at such different temperatures, that in the earlier appropriate for primary or edible cooking of the food, and that in the later adapted for finishing or browning the food; a conveyor whereon the food may be secured travelling a course first down into, through, and up out of the grease in the earlier compartment, and then down into, through, and up out of the grease in the later compartment; and means for advancing the conveyor at a rate so correlated with the temperature of the grease and the length of travel of the food therethrough in the several compartments that practically any food emerges abundantly cooked from the final compartment, while many foods emerge from the earlier edibly or satisfactorily cooked, according to some tastes.

WALTER R. SCHARSCH.